(12) United States Patent
Debruyne et al.

(10) Patent No.: US 11,560,040 B2
(45) Date of Patent: Jan. 24, 2023

(54) METHOD FOR MANUFACTURING A HEATING MAT FOR A MOTOR VEHICLE

(71) Applicant: FAURECIA AUTOMOTIVE INDUSTRIE, Nanterre (FR)

(72) Inventors: Anne-Sophie Debruyne, Charleville-Mezieres (FR); Franck Jeunehomme, Montherme (FR); Didier Liaud, Pouru Saint Remy (FR); Valérie Marcel, Brandeville (FR)

(73) Assignee: FAURECIA AUTOMOTIVE INDUSTRIE, Nanterre (FR)

( * ) Notice: Subject to any disclaimer, the term of this patent is extended or adjusted under 35 U.S.C. 154(b) by 362 days.

(21) Appl. No.: 16/833,049

(22) Filed: Mar. 27, 2020

(65) Prior Publication Data

US 2020/0307356 A1 Oct. 1, 2020

(30) Foreign Application Priority Data

Mar. 27, 2019 (FR) ...................................... 19 03185

(51) Int. Cl.
*B60H 1/22* (2006.01)
*B60R 13/02* (2006.01)

(52) U.S. Cl.
CPC ............ *B60H 1/2227* (2019.05); *B60R 13/02* (2013.01); *B60R 2013/0287* (2013.01)

(58) Field of Classification Search
CPC . B60H 1/227; B60R 13/02; B60R 2013/0287; H01R 43/26; H01R 4/64; E01C 9/086; E01C 5/005
See application file for complete search history.

(56) References Cited

U.S. PATENT DOCUMENTS 9,337,586 B2 * 5/2016 McDowell .............. E01C 11/24
9,972,942 B1 * 5/2018 Bordelon ................ E01C 5/005

FOREIGN PATENT DOCUMENTS

| CA | 2780308 A1 * | 5/2011 | ......... B60H 1/00271 |
| CN | 207416640 U | 5/2018 | |
| DE | 10159814 A1 * | 6/2003 | ......... B29C 44/1233 |
| DE | 202014103928 U1 * | 6/2015 | ........... B60H 1/2215 |
| FR | 2757116 A1 | 6/1998 | |
| FR | 2864486 A1 | 7/2005 | |

OTHER PUBLICATIONS

French Search Report corresponding to French application No. FR 1903185, dated Oct. 28, 2019, 2 pages.

* cited by examiner

*Primary Examiner* — Lori L Lyjak
(74) *Attorney, Agent, or Firm* — Reising Ethington P.C.

(57) ABSTRACT

A method for manufacturing a heating mat for a motor vehicle. The method includes the following steps: providing a heating ply having a deformable structure and two heating elements inserted into the structure, said two heating elements being separated by a deformation area of the structure; stacking the heating ply between an upper layer and a lower layer, wherein at least one of the heating ply and the upper and lower layers includes a thermoformable material; assembling the stack by at least one fastening rod; and thermoforming the stack thus assembled, so as to secure the heating ply and the upper and lower layers into a single piece; and stretching the deformation area in the stacking direction.

12 Claims, 3 Drawing Sheets

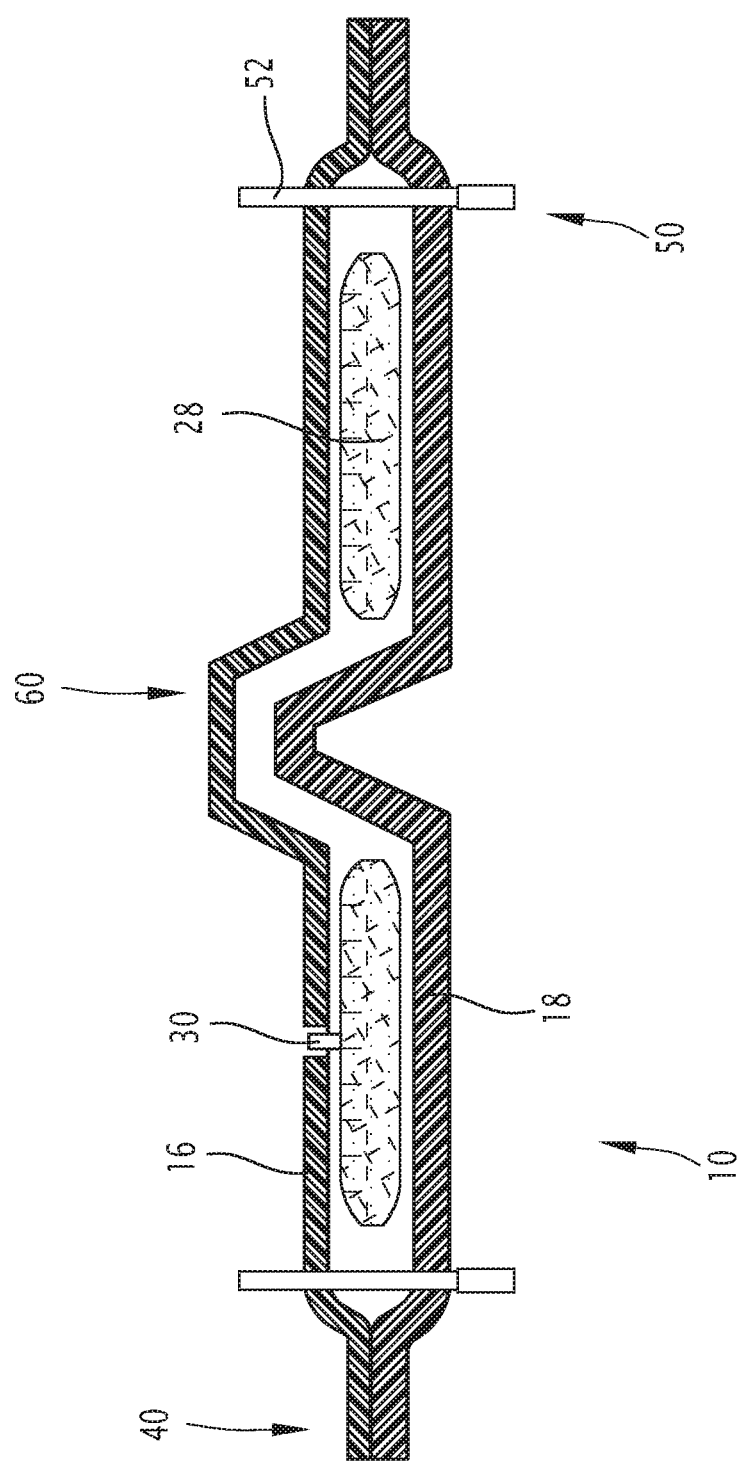

METHOD FOR MANUFACTURING A HEATING MAT FOR A MOTOR VEHICLE

TECHNICAL FIELD

The present invention relates to a method for manufacturing a heating mat for a motor vehicle.

BACKGROUND

Systems for heating motor vehicles by blowing hot air have many drawbacks, such as the slowness, the noise and the difficulty of selectively heating certain areas of the passenger compartment.

It is known, in particular from document FR 2,864,486, to equip the mats of vehicles with integrated heating elements, in order to perform heating from the floor. In particular, it is wise to position the heating elements in locations at the driver's and/or passengers' feet, in order to optimize the effectiveness of the heating.

It is also known to make vehicle mats by thermoforming several layers of materials. The integration of heating elements into a mat made using such a method has several difficulties, in particular keeping said heating elements in appropriate locations during the thermoforming.

SUMMARY

The present invention aims to propose a manufacturing method making it possible to produce a thermoformed mat easily and effectively, incorporating heating elements.

To that end, the invention relates to a manufacturing method of the aforementioned type, comprising the following steps: providing a first heating ply extending substantially along a first axis, said first heating ply comprising: a first deformable structure; and two heating elements inserted into said first structure, said two heating elements being axially aligned and separated by a deformation area of said first structure; stacking the first heating ply between an upper layer and a lower layer, along a stacking direction substantially perpendicular to the first axis; at least one of said first heating ply and said upper and lower layers comprising a thermoformable material; assembling the stack by at least a first fastening rod passing through the first heating ply and the upper and lower layers; and thermoforming the stack thus assembled, so as to secure the first heating ply and the upper and lower layers into a single piece; and stretching the deformation area of the first heating ply in the stacking direction.

According to other advantageous aspects of the invention, the method includes one or more of the following features, considered alone or according to all technically possible combinations:

- during the stacking step, a second heating ply is arranged between the upper and lower layers, said second heating ply extending substantially along a second axis parallel to the first axis, the first and second heating plies being spaced apart along a third axis perpendicular to the first and second axes in the stacking direction; said second heating ply comprising: a second deformable structure; and two heating elements inserted into said second structure, said two heating elements being axially aligned and separated by a deformation area of said second structure;
- the step for assembling the stack comprises placing at least one second fastening rod passing through the second heating ply and the upper and lower layers;
- the first structure includes fibers impregnated with a thermoformable material, preferably thermoplastic;
- the upper layer or the lower layer includes fibers impregnated with a thermoformable material, preferably thermoplastic;
- the stacking step comprises depositing a layer of adhesive between the first heating ply and the upper layer and/or between the first heating ply and the lower layer, the thermoforming step activating said adhesive;
- the assembly step comprises perforating the stack with a plurality of fastening rods secured to one another by a frame, said fastening rods being kept in place during the thermoforming step;
- the manufacturing method further comprises, before the thermoforming step, a step for cutting the upper layer and/or the lower layer near at least one of the two heating elements of the first heating ply;
- the manufacturing method further comprises, after the thermoforming step, a step for cutting the single piece, at a distance from the heating elements.

The invention further relates to a heating mat derived from a manufacturing method as disclosed above.

BRIEF DESCRIPTION OF THE DRAWINGS

The invention will be better understood upon reading the following description, provided solely as a non-limiting example and done in reference to the drawings, in which:

FIG. 3 is a schematic cross-sectional view of another step of the method for manufacturing a heating mat.

DETAILED DESCRIPTION

Figure 1:
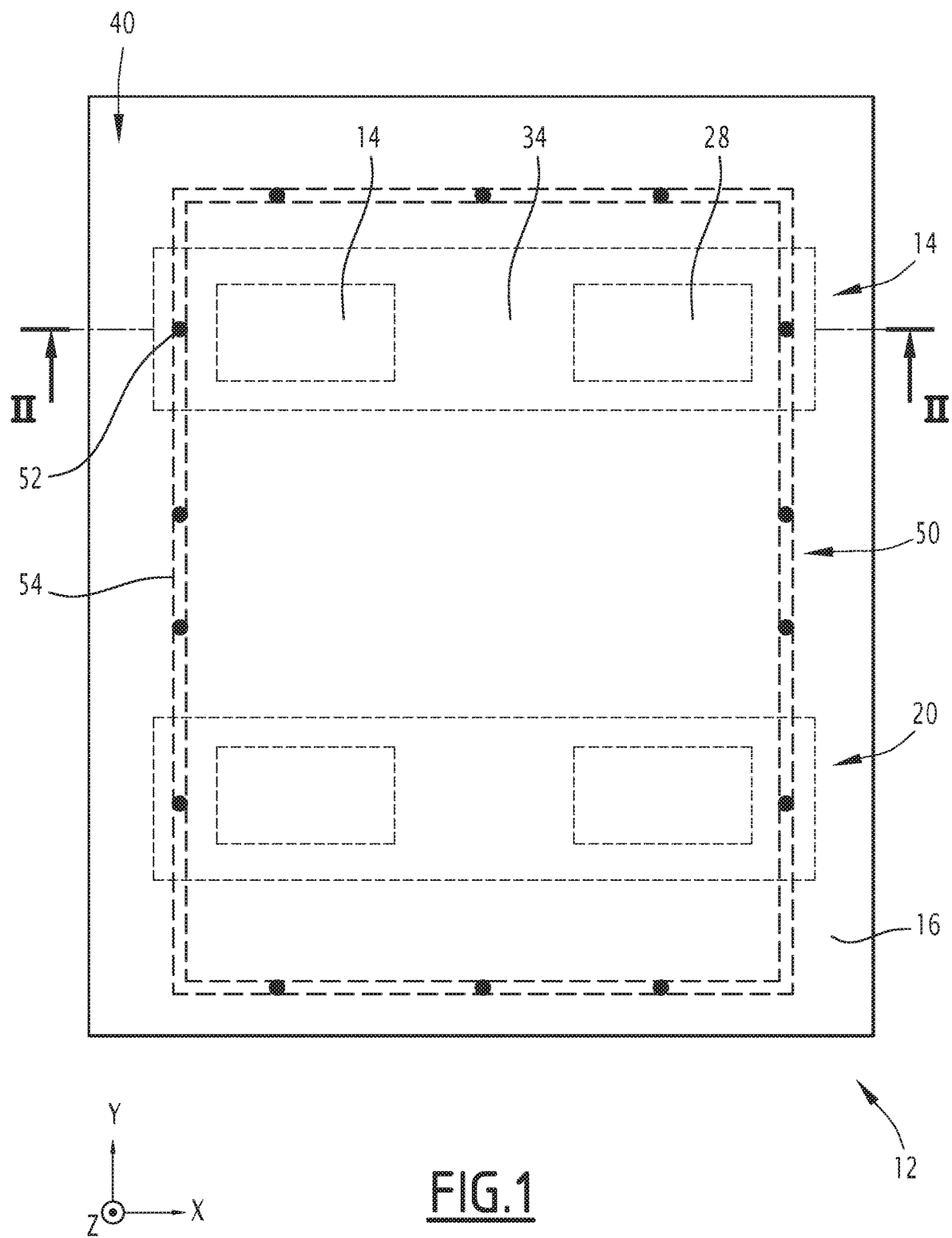
FIG. 1 is a schematic top view of a stack according to one step of a method for manufacturing a heating mat according to one embodiment of the invention.
Figure 2:
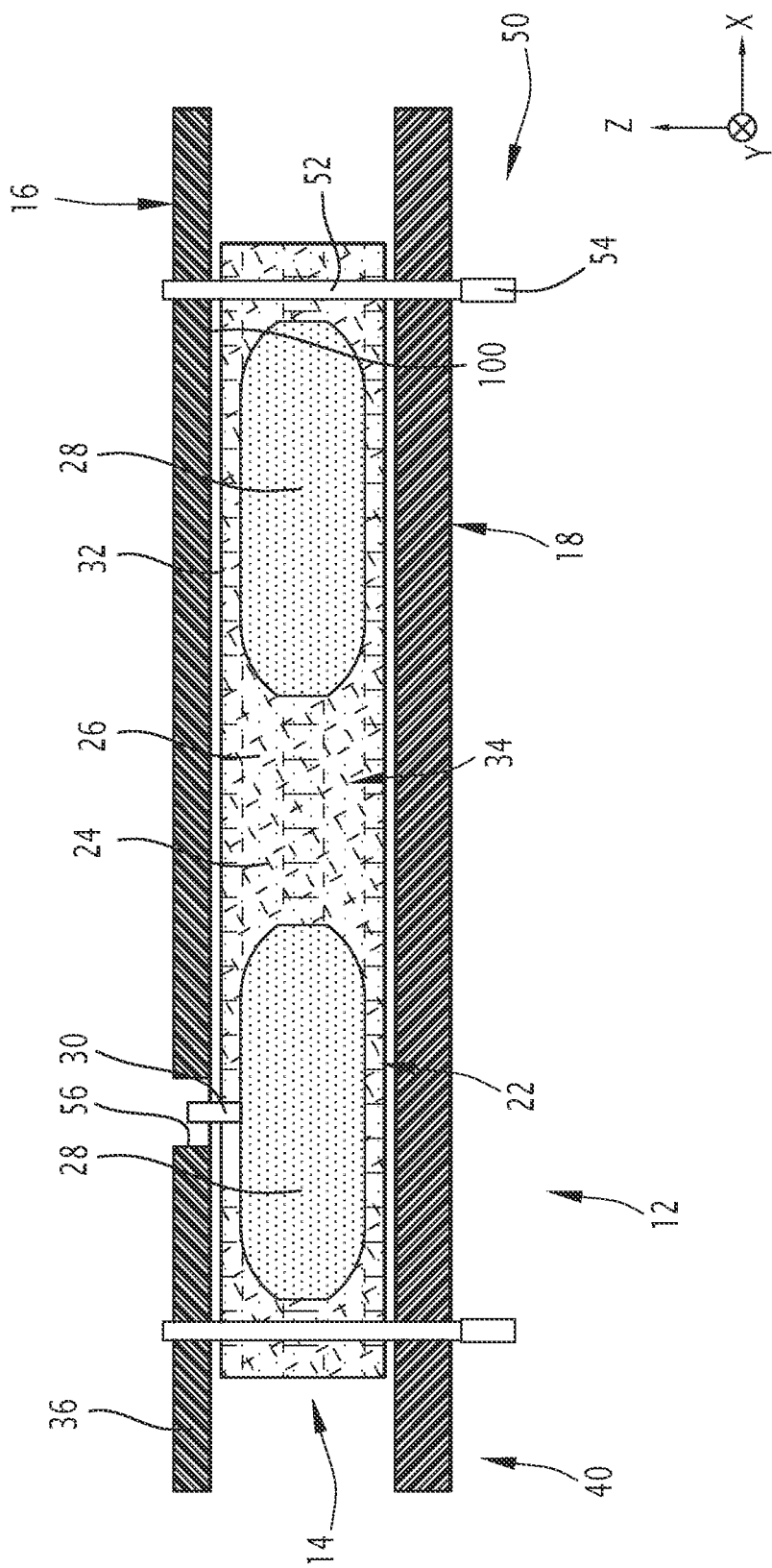
FIG. 2 is a schematic cross-sectional view of the stack of FIG. 1.

FIGS. 1, 2 and 3 schematically show different steps of a method for manufacturing a heating mat 10, according to one embodiment of the invention. The heating mat 10, preferably a heating mat for a motor vehicle, will be disclosed in more detail below.

In a first step of the method for manufacturing the heating mat 10, a stack 12 is made, as shown in FIGS. 1 and 2.

The stack 12 includes: at least a first heating Ply 14, an upper layer 16, and a lower layer 18.

An orthonormal coordinate system (X, Y, Z) is considered, the direction Z representing the vertical. The terms "upper" and "lower" are to be understood relative to a vertical stacking direction.

In the illustrated embodiment, the stack 12 further comprises a second heating ply 20 visible in FIG. 1. The first and second heating plies 14 and 20 will be disclosed simultaneously hereinafter.

The heating ply 14, 20 comprises a structure 22 formed by a deformable material, in particular a textile material. Preferably, the structure 22 includes natural or synthetic fibers 24, more preferably in a nonwoven form. The fibers used are for example chosen from among polyester terephthalate (PET) and polyamide (PA) fibers.

According to one preferred embodiment, the structure 22 includes fibers 24 impregnated with a first thermoplastic material 26. Alternatively, the fibers 24 are mixed with fusible fibers, formed by a first thermoplastic material 26 having a softening temperature below that of said fibers 24.

The structure 22 of the heating ply 14, 20 extends in a plane (X, Y) and has an elongated shape in the direction X.

The heating ply 14, 20 further comprises two heating elements 28, inserted in the structure 22. According to one embodiment, each heating element 28 is completely covered by said structure 22. In a variant, each heating element 28 is fastened on a surface of the structure 22, for example by sewing.

The heating elements 28 of a same heating ply 14, 20 are preferably substantially identical. The heating elements 28 are preferably electric heating elements, comprising an electric resistance.

A heating element 28 preferably has a plate shape extending along a plane (X, Y). The heating element 28 for example comprises a heating electrical wire arranged in the shape of a planar coil.

Preferably, the heating ply 14, 20 further comprises at least one electrical connection member 30 per heating element 28. A single connection member 30 is shown as an example in FIGS. 2 and 3.

The connection member 30, such as an electric plug, is for example fastened to the corresponding heating element 28 and forms a protrusion relative to an upper face 32 of the structure 22.

The two heating elements 28 are substantially aligned along X and separated by an intermediate area 34 of the structure 22. As will be described in detail hereinafter, the intermediate area 34 is able to be deformed, in particular stretched, at least after heating.

The upper layer 16 is configured for a decorative layer function of the mat 10. Said upper layer 16 is for example of the carpet type.

The upper layer 16 is formed by a deformable material, preferably a nonwoven textile. Additionally, said upper layer 16 preferably comprises a thermoplastic material. According to one preferred embodiment, the upper layer 16 includes fibers impregnated with a second thermoplastic material 36.

The second thermoplastic material 36 is different from the first thermoplastic material 26, or similar to said first material. In the case where said first and second thermoplastic materials are different, they preferably have comparable glass transition and/or melting temperatures.

As an example, the first 26 and/or second 36 thermoplastic material is chosen from a polyethylene and/or a co-polyester terephthalate. The first 26 and/or second 36 thermoplastic material preferably has a low melting point, in particular less than about 140° C.

The lower layer 18 is configured for a sound insulation function of the mat 10 and is formed from a deformable material. According to one embodiment, the lower layer 18 is a nonwoven textile of the felt type. According to another embodiment, the lower layer 18 is of the "heavy mass" type, that is to say, a polymer layer incorporating fillers.

The upper 16 and lower 18 layers extend in superimposed planes (X, Y). Preferably, said upper 16 and lower 18 layers have comparable dimensions along X and Y.

As shown in FIG. 1, said dimensions of the layers 16 and 18 are greater than the dimensions of the or each heating ply along X and Y. The stack 12 therefore includes several areas in which the upper 16 and lower 18 layers are directly in contact with one another. In particular, the stack 12 preferably includes an edge 40 closed on itself, along which the layers 16 and 18 are directly in contact with one another.

Preferably, the dimensions of the layers 16 and 18 along X and Y are configured so as to obtain a mat 10 able to cover the floor of a vehicle passenger compartment. Preferably, the dimensions of the or each heating ply 14, 20 and the position of the heating elements 28 are configured such that said heating elements are located at the feet of the driver and/or of one or several passages in the passenger compartment of the vehicle.

In the illustrated embodiment, the directions X and Y respectively correspond to a movement direction of the vehicle and a transverse direction of said vehicle. The first heating ply 14 is placed at the locations of the feet of the driver and the front passenger. The second heating ply 20 is placed at the locations of the feet of the rear passengers.

Preferably, at least one of the faces of the upper 16 and lower 18 layers, in contact with one another, is covered with a heat-activated adhesive 100. This is for example a polymer-based adhesive, the softening temperature of which is greater than the usage temperature of the heating ply, for example a polyamide.

Preferably, at least one of the faces of the or each heating ply 14, 20 is also covered with an adhesive 100 able to be heat-activated.

In a second step of the manufacturing method, which is optionally simultaneous with the first step previously disclosed, a holding device 50 is assembled with the stack 12. Said holding device 50 aims to assemble the heating plies 14, 20 and the upper 16 and lower 18 layers to one another, so as to hold their respective positions in the remainder of the method.

The holding device 50 comprises at least one fastening rod 52, or spur, arranged along Z. The fastening rod 52 successively passes through the lower layer 18, the heating ply 14, 20 and the upper layer 16. Preferably, the fastening rod 52 passes through the structure 22 of the heating ply 14, 20, at a distance from the heating elements 28.

Preferably, the holding device 50 comprises at least two fastening rods 52, arranged at each end along X of a same heating ply 14, 20. In the illustrated embodiment, each heating ply 14, 20 is held by at least two fastening rods.

In the illustrated embodiment, the holding device 50 comprises a frame 54 supporting a plurality of fastening rods 52. Some of said fastening rods assemble the upper 16 and lower 18 layers in the areas where said layers are in direct contact with one another.

In an optional third step of the manufacturing method, as shown in FIG. 2, a slit 56 is cut into the upper layer 16 opposite each heating member electrical connection member 30.

Next, the stack 12 assembled to the holding device 50 is heated and thermoformed, so as to give the mat 10 a three-dimensional shape. The heating temperature is greater than a softening temperature of the first 26 and second 36 thermoplastic materials, for example between 140° C. and 180° C. This temperature range is small enough not to damage the heating elements 28.

The heating results in softening the first 26 and/or second 36 thermoplastic materials. In the case where the structure 22 of the heating ply 14, 20 comprises fibers 24 impregnated with first material 26, said fibers then become movable relative to one another. The same is true for the upper layer 16 in the case where it comprises fibers impregnated with second material 36.

It is then possible to stretch the upper layer 16 and the structure 22 of the heating ply 14, 20 along Z, without tearing them. In particular, the intermediate area 34 of the structure 22 can be stretched along Z.

In particular, during the thermoforming step, a relief 60 is formed along Y, substantially along a median plane of the stack 12. Said relief in particular passes through the intermediate area 34, at a distance from the heating elements 28 of the heating ply 14, 20.

The material of the lower layer 18 is also chosen so as to form the relief 60 without tearing said material.

The thermoforming is for example done by hot compressing the stack 12 between a mold and a counter-mold (not shown). This hot compression also results in securing the layers 16, 14, 20, 18 of the stack 12 to one another, in particular owing to the action of any adhesives described above.

The presence of the holding device 50 allows the position of the ply 14, 20 not to vary relative to the layers 16 and 18 during the thermoforming, which guarantees a position of the heating elements 28 in the desired locations in the mat 10.

After cooling, the mat 10 is obtained in the form of a single piece. Preferably, the connection member(s) 30 are flush with the surface of said part at the corresponding slit(s) 56, allowing a subsequent electrical connection of each corresponding heating element 28.

The mat 10 is next separated from the holding device 50.

In a potential additional step of the manufacturing method, one or several cutouts are made in the mat 10 so as to finalize its shape. The cutouts are preferably made at a distance from the heating elements 28, for example at the edge 40 and/or the relief 60. The cutouts are for example made by pressurized water jet.

The method described above makes it possible to obtain a thermoformed heating mat 10 easily, in which the heating elements 28 are incorporated in the desired locations. Furthermore, said heating elements are protected by the different layers of the mat, which improves the lifetime of the latter.

In particular, the method disclosed above makes it possible to obtain a heating mat including a central relief 60 of significant size, without tearing of the materials of said mat.

The invention claimed is:

1. A method for manufacturing a heating mat for a motor vehicle, comprising the following steps:
    providing a first heating ply extending substantially along a first axis, said first heating ply comprising: a first deformable structure; and two heating elements inserted into said first structure, said two heating elements being axially aligned and separated by a deformation area of said first structure;
    stacking the first heating ply between an upper layer and a lower layer, along a stacking direction substantially perpendicular to the first axis; at least one of said first heating ply and said upper and lower layers comprising a thermoformable material;
    assembling the stack by at least a first fastening rod passing through the first heating ply and the upper and lower layers; and
    thermoforming the stack thus assembled, so as to secure the first heating ply and the upper and lower layers into a single piece; and stretching the deformation area of the first heating ply in the stacking direction.

2. The manufacturing method according to claim 1, further comprising a step of providing a second heating ply comprising: a second deformable structure; and two heating elements inserted into said second structure, said two heating elements being axially aligned and separated by a deformation area of said second structure;
    wherein, during the stacking step, the second heating ply is arranged between the upper and lower layers, said second heating ply extending substantially along a second axis parallel to the first axis, the first and second heating plies being spaced apart along a third axis perpendicular to the first and second axes in the stacking direction.

3. The manufacturing method according to claim 2, wherein the step for assembling the stack comprises placing at least one second fastening rod passing through the second heating ply and the upper and lower layers.

4. The manufacturing method according to claim 1, wherein the first structure includes fibers impregnated with a thermoformable material.

5. The manufacturing method according to claim 1, wherein the upper layer or the lower layer includes fibers impregnated with a thermoformable material.

6. The manufacturing method according to claim 1, wherein the stacking step comprises depositing a layer of adhesive between the first heating ply and the upper layer and/or between the first heating ply and the lower layer, the thermoforming step activating said adhesive.

7. The manufacturing method according to claim 1, wherein the assembly step comprises perforating the stack with a plurality of fastening rods secured to one another by a frame, said fastening rods being kept in place during the thermoforming step.

8. The manufacturing method according to claim 1, further comprising, before the thermoforming step, a step for cutting the upper layer and/or the lower layer near at least one of the two heating elements of the first heating ply.

9. The manufacturing method according to claim 1, further comprising, after the thermoforming step, a step for cutting the single piece, at a distance from the heating elements.

10. A heating mat for a motor vehicle, made by the manufacturing method according to claim 1.

11. The manufacturing method according to claim 4, wherein the thermoformable material is thermoplastic.

12. The manufacturing method according to claim 5, wherein the thermoformable material is thermoplastic.

* * * * *